(12) United States Patent
Wetmore et al.

(10) Patent No.: US 7,743,104 B2
(45) Date of Patent: Jun. 22, 2010

(54) MESSAGE DELIVERY TO MULTIPLE FORESTS WITH NO UNIFIED DIRECTORY

(75) Inventors: Alexander R. Wetmore, Seattle, WA (US); Malcolm E. Pearson, Kirkland, WA (US); Wayne M. Cranston, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1342 days.

(21) Appl. No.: 10/927,699

(22) Filed: Aug. 27, 2004

(65) Prior Publication Data

US 2006/0047759 A1 Mar. 2, 2006

(51) Int. Cl.
*G06F 15/177* (2006.01)
(52) U.S. Cl. .......................... 709/206; 709/220; 709/226
(58) Field of Classification Search ................... 709/206
See application file for complete search history.

(56) References Cited

U.S. PATENT DOCUMENTS 6,865,594 B1 *   3/2005   Belissent et al. ............ 709/206
2002/0178238 A1 *  11/2002   Fletcher et al. ............. 709/220
2003/0007482 A1 *   1/2003   Khello et al. ............... 370/352

OTHER PUBLICATIONS

Xiang, Y., "Comparison of Multiagent Inference Methods in Multiply Sectioned Bayesian Networks," International Journal of Approximate Reasoning, vol. 33, Issue 3, Aug. 2003, pp. 235-254.

* cited by examiner

*Primary Examiner*—Jeffrey Pwu
*Assistant Examiner*—Sulaiman Nooristany
(74) *Attorney, Agent, or Firm*—Workman Nydegger (57) ABSTRACT

The present invention provides for a messaging system that automatically identifies a forest that corresponds to a particular recipient of a message, without using a common or unified directory that maps forests with recipients. In a network with multiple forests, each forest having multiple recipients, when a message is received at a message server with a destination address that does not uniquely identify a particular forest, the present invention provides for using a standard messaging protocol for querying each forest. The forests respond with status codes that indicate whether or not a recipient associated with the destination address corresponds to the forest being queried. If a status code indicates that the recipient corresponds to the particular forest, information may be stored and used to quarry that particular forest first, before querying other forests within the network.

26 Claims, 4 Drawing Sheets

MESSAGE DELIVERY TO MULTIPLE FORESTS WITH NO UNIFIED DIRECTORY

CROSS-REFERENCE TO RELATED APPLICATIONS

N/A

BACKGROUND OF THE INVENTION

1. The Field of the Invention

The present invention general relates to electronic messaging systems. More specifically, the present invention provides for automatically identifying a forest corresponding to a particular recipient, in a network that includes multiple forests, without the use of a common directory that maps recipients to forests.

2. Background and Related Art

Although computers were once isolated and had minimal or little interaction with other computers, computers today interact with a wide verity of other computers through Local Area Networks (LANs), Wide Area Networks (WANs), dial-up connections, and so forth. With the wide-spread growth of the Internet, connectivity between computers is becoming more important and has opened up many new applications and technologies. The growth of large-scale networks and the wide spread availability of low-cost personal computers has fundamentally changed the way that many people work, interact, communicate, and play.

Electronic communications among users of various computer systems have been known for many years. Many companies have developed internal electronic messaging systems that allow email communications between various computers connected to corporate LANs and/or other networks. Many companies have reengineered the processes and procedures to take maximum advantage of email communications in order to provide a convenient mechanism for exchanging information and documents, thus reducing the handling of paperwork and speeding the flow of information between and among employees of various departments. Traditionally, however, large-scale networks connecting various divisions over vast distances were extremely expensive. In addition, the large-scaled networks which did exist generally used proprietary protocols, which were difficult to interconnect with other networks.

With the growth and development of the Internet, however, the situation has changed dramatically. Today, a company may install a corporate LAN at sites separated by large geographic distances and "back bone" communications between sites over the Internet. In many ways, the Internet has become a standard with which any viable network must interact.

When sending a message, a client communicates with a message or mail server telling the server such information as the address of the sender, address of the recipient, as well as the body of the message. The message server then takes the "to" address, i.e., the recipient address, and identifies a domain name associated therewith. The sender's mail server then communicates with a Domain Name Server (DNS) for identifying the IP address for the recipient's server. The sender's server then use the one or more IP addresses received along with a standard protocol, e.g., Simple Mail Transfer Protocol (SMTP), for establishing a connection between the two servers for communicating the electronic message.

Within a single network or organization there may be several domain names, which are arranged in a domain hierarchy. For instance, a group of domain names that have the same DNS, e.g., company.com (the parent domain), sales.com-pany.com, and support.company.com (the child domains) are referred to as a tree. A forest is a set of domain trees that do not form a contiguous name space. All trees in a forest share a common schema, configuration, and global catalog.

A single organization or network may include a multitude of forests, each of which supports numerous recipients. Such is typically the case when companies merge, e.g., one company buys out the other. Each company has its own message forests, and then when the companies merge, they subsequently create a common messaging service. For example, company A with forest A.com merges with company B with forest B.com, and subsequently form company AB with domain AB.com, which includes both forests A.com and B.com.

In order to appropriately direct and identify a forest that corresponds to a particular recipient, typically a manual mapping or table generation is done for the multiple forests. Creating such unified or common directories, however, can be extremely tedious and costly. For instance, when companies merge and combine messaging systems with multiple forests that support hundreds of thousands of employees or recipients, the manual process to map a particular recipient to particular forest can take years to accomplish and is subject to human error.

Figure 1:
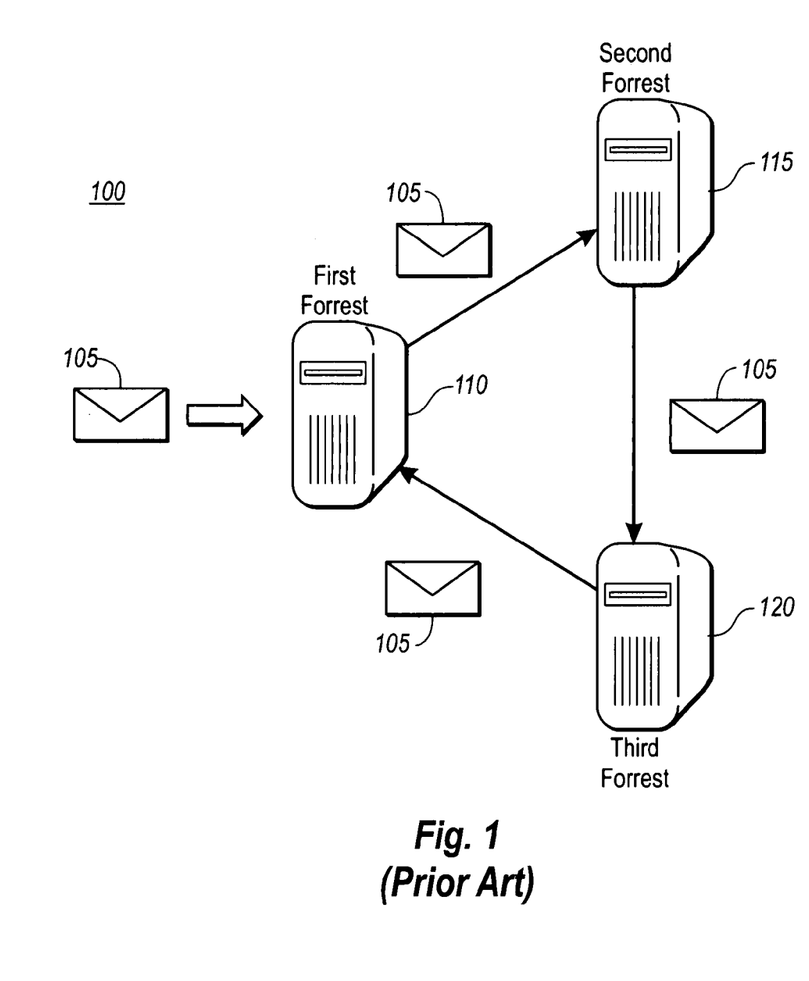
FIG. 1 illustrates a prior art messaging system for routing messages among a plurality of forests.

In order to resolve the problems associated with creating a unified directory that maps recipients to a particular forest, recent developments have reconfigured systems in order to circulate messages throughout each forests. For example, as shown in FIG. 1, a network 100 has multiple forests 110, 115, 120, which are configured in loop fashion. A message 105 is placed within the transport loop, wherein each forest can determine if one or more recipients associated with the message 105 reside within that particular forest. For instance, first forest 110 may receive message 105 and evaluate the contents to determine if it is destined for a recipient within its forest. If the first forest 110 does not recognize one or more recipient address associated with the message 105, the message 105 can be forwarded to second forest 115. Similarly, the second forest 115 will also evaluate the contents of the message 105, wherein if the second forest 115 does not identify all of the recipient addresses within message 105, the message 105 is then passed to third forest 120. This process is repeated until any particular forest within the network 100 takes full responsibility for message 105, or the message 105 is timed out.

Although such loop configuration solves the problems associated with creating unified directories for routing messages among multiple forests, there are several drawbacks associated with such system. For example, if a message enters the network, but is not fully accepted by any one forest, the message has the potential of looping many times before exceeding its hop count. Further, if there are a multitude of these messages looping in the system at anyone time, bandwidth problems may arise that slow the overall system. In addition, there exits several security issues, such as the potential for a forest to accept messages erroneously or maliciously.

BRIEF SUMMARY OF THE INVENTION

The above-identified deficiencies and draw backs of current messaging systems with multiple forests are over come by the present invention. For example, in messaging systems that include multiple forests each with a plurality of message recipients, and no unified directory to link a particular forest with a particular recipient, the present invention provides for the ability to distribute messages within the network by automatically identifying what forests corresponds to a particular recipient.

Exemplary embodiments provide for receiving a first message at a server that controls message delivery to a plurality of forests using a message protocol. The first message includes a first destination address that does not uniquely identify a particular forest from among the plurality of forests. A first communication link is established between the message server and a first forest from among the plurality of forest. The message server sends a first recipient inquiry to the first forest over the first communication link, and receives a first status code that indicates whether or not the first forest corresponds to a first recipient associated with the first destination address. Based upon the first status code, it is determined if the first message should be forwarded to the first forest for subsequent delivery to the first recipient.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to methods, systems and computer program products for automatically identifying a forest that corresponds to a particular recipient of an electronic message, without the use of a unified directory. The embodiments of the present invention may comprise a special purpose or general-purpose computer including various computer hardware, as discussed in greater detail below.

The present invention provides for a message network—that includes multiple forests that correspond to a plurality of recipients—configured to automatically discover or identify what forest corresponds to a particular recipient, without using a unified or common directory that maps a recipient to a forest. Rather than simply configuring the forests in a loop type fashion, the present invention provides for using querying features of standard message protocols, e.g., Simple Mail Transfer Protocol (SMTP), to probe each forest within the network to determine if a recipient corresponds to a particular forest. This information can then be stored and utilized for subsequent messages that are received, such that the message server will query the identified forest(s) before querying any other forests.

Figure 2:
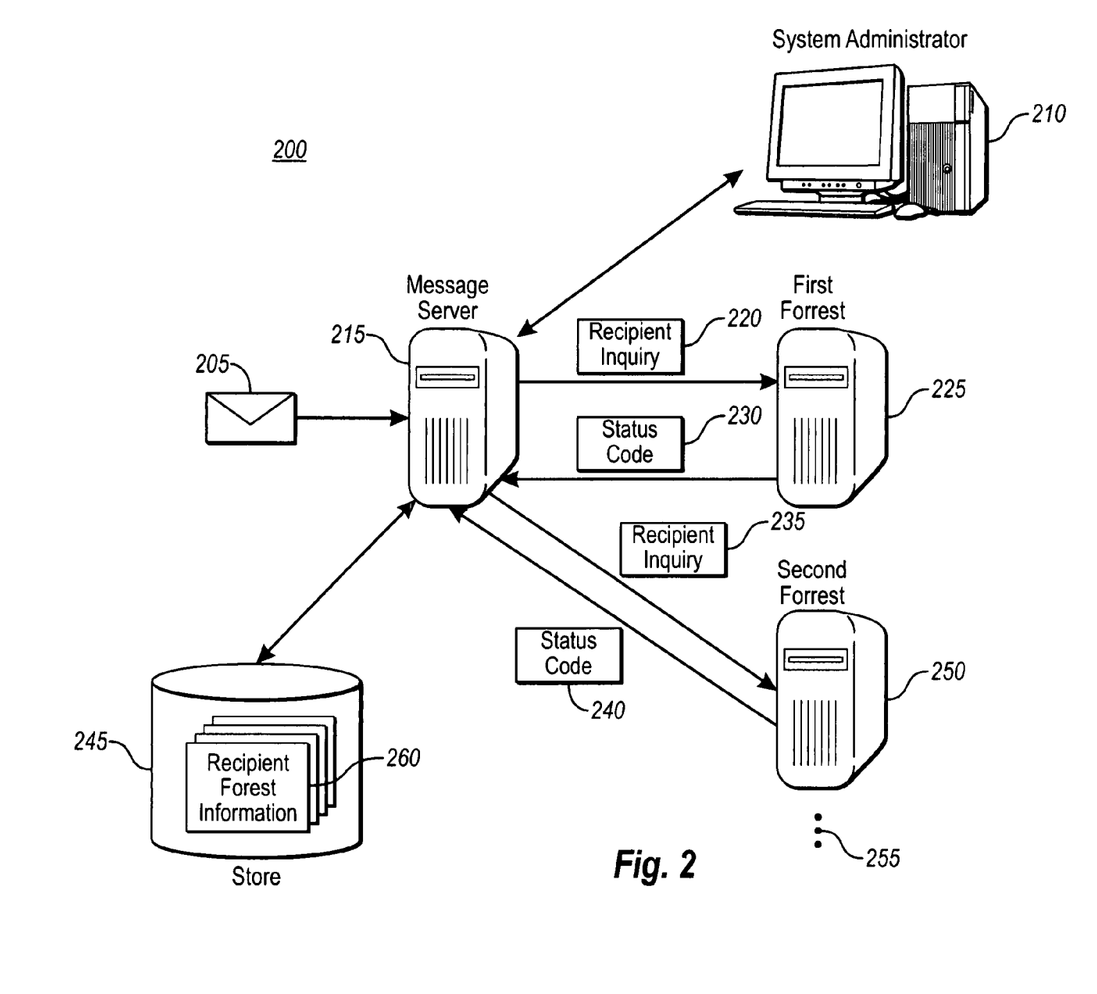
FIG. 2 illustrates a messaging system network for identifying a forest that corresponds to a particular recipient of a message without a unified directory in accordance with exemplary embodiments of present invention.

FIG. 1 illustrates an example of the above-identified embodiments, which shows a network 200 with a central message server 215 and multiple forests. The message server 215 controls the distribution of incoming messages 205 for each forest within the network 200. For example, message 205 may be received by message server 215, whereupon the message server 215 evaluates the destination address or addresses corresponding to one or more recipients that are to receive the message 205. Message server 215 is configured with a list of forests, which it can locally deliver email to using a standard message protocol, e.g., SMTP. If the destination address of message 205 has a domain name that is uniquely associated with a particular forest, message server 215 can simply route message 205 to the appropriate forest. If, however, the destination address within message 205 is ambiguous, exemplary embodiments provide for using a standard message protocol for querying each forest within the network 200 in determining if a recipient associated with the destination address corresponds to the particular forest.

Domain names associated with destination addresses of messages 205 typically become ambiguous through the merging of two companies. For example, as previously mentioned, company A has a domain name of A.com and company B has a domain name of company B.com, but when they merge they create a new domain name of AB.com. Nevertheless, each server, or servers, within each company are maintained as separate forests. As such, when a destination address for a particular recipient includes the new or ambiguous domain name of AB.com, the forest corresponding to that recipient needs to be determined in order to appropriately route message 205.

As previously mentioned, exemplary embodiments provide for automatically discovering which forest corresponds to a particular recipient of message 205 when the message 205 includes a destination address that does not uniquely identify a particular forest within the network—without using a unified or common directory that maps the forest to the appropriate recipient. For instance, upon identifying message 205 as including an ambiguous or unidentifiable destination address or domain name, message server 215 can use a message protocol (e.g., SMTP) to send a recipient inquiry 220 to a first forest 225.

The recipient inquiry 220 may simply be the user name portion of the destination address, querying the first forest whether or not a recipient associated with the user name resides within the first forest 225. Of course, the recipient inquiry 220 could also include the domain name of the destination address. For example, an ambiguous domain name may be associated with a particular server within a forest. The message server 215, however, may not have information about all the domain names corresponding to a particular forest. In such instance, message server 215 may include destination address with the user name portion, the domain name portion, or both, when sending recipient inquiry 220 to a first forest 225. Accordingly, the use of a destination address within the recipient inquiry 220 should be broadly interpreted to include the user name portion, domain name portion, or any other information that can uniquely identify a destination address as corresponding to a particular recipient, and or particular server. In addition, the use of the term recipient should be broadly construed to include a destination server within a forest.

Upon receiving recipient inquiry 220, first forest 225 evaluates the information for determining if the destination address associated with message 205 corresponds to a recipient (and/or server) within its domain. The first forest then generates a status code 230 using the message protocol and sends the status code 230 back to message server 215. The message server 215 then uses the status code 230 for determining if message 205 should be sent to the first forest. If the status code 230 is a none delivery receipt, or error code, indicating that the recipient is not associated with the first forest 225, then message server 215 can send a recipient inquiry 235 to a second forest 250 within network 206. Similar to first forest 225, second forest in response to the receipt inquiry 235 generates a status code 240, which is sent to the message server 215 for determining if the recipient corresponds to the second forest. This process can continue for any number of servers as indicated by the vertical ellipses 255.

It should be noted that although the above example queried second forest 250 based upon the result of querying first forest 225, other methods and systems for discovering the forest that corresponds to the destination address associated with message 205 are also available. For example, message server 215 could query second forest 250, before querying first forest. Further, regardless of the outcome for the query for the first forest 225, and as describe in greater detail below with regard to other example embodiments, message server 215 may query every forest within network 200. Accordingly, any particular manner and/or ordering in which the querying of the forests 225, 250, 255 within the network 200 is accomplished is used for illustrative purposes only and is not meant to limit or otherwise narrow the scope of the present invention unless otherwise explicitly claimed.

Through the above querying process, when message server 215 discovers at least one forest corresponding to a recipient of the message 205 other exemplary embodiments provide for storing the recipient forest information 260 within a store 245. This recipient forest information 260 may then be used for subsequent messages with similar destination addresses for trying that particular forest first, before querying other forest. It should be noted that the destination address for subsequently received messages does not necessarily have to be identical to the destination address of the first message received. For example, the user name portion of the destination address maybe sufficient to uniquely identify a particular forest that corresponds to a particular recipient. Further, as described below, there may be several forests that correspond to a particular recipient. In such instance, information about each forest may be stored within the recipient forest information 260, wherein these forests are queried before others within the network 200.

In the instance were the message server 215 queries every forest within the network 200 regardless of the status code 240, and wherein multiple status codes 230, 240 indicate that a recipient corresponds to multiple forests, exemplary embodiments provide for several ways of resolving such conflict. For example, in one embodiment the present invention provides for forwarding message 205 to the multiple forests, in such instances that a trust exists between the conflicting forests. Such may be the case for a recipient that travels back and forth between two or more forests, and desires to have the messages 205 within each forest.

Alternatively, message server 215 may attempt to resolve the conflict by sending information about the conflict into some form of arbitration. For example, message server 215 may send conflict information to a system administrator 210 that can definitively determine the appropriate forest for which message 205 may be sent. Of course, other methods and systems for resolving conflicts are also available to the present invention. Accordingly, the use of the system administrator 210 in discovering which forest message 205 should be sent to is used for illustrative purposes only and is not meant to limit or otherwise narrow the scope of the present invention unless otherwise explicitly claimed.

The present invention may also be described in terms of methods comprising functional steps and/or non-functional acts. The following is a description of steps and acts that may be preformed in practicing the present invention. Usually, functional steps describe the invention in terms of results that are accomplished where as non-functional acts describe more specific actions for achieving a particular result. Although the functional steps and non-functional acts may be described or claimed in a particular order, the present invention is not necessary limited to any particular ordering or combination of acts and/or steps. Further, the use of act and/or steps in the recitation of the claims and in the following description of the flow charts for FIG. 3 are used to indicate the desired specific use of such terms.

Figure 3:
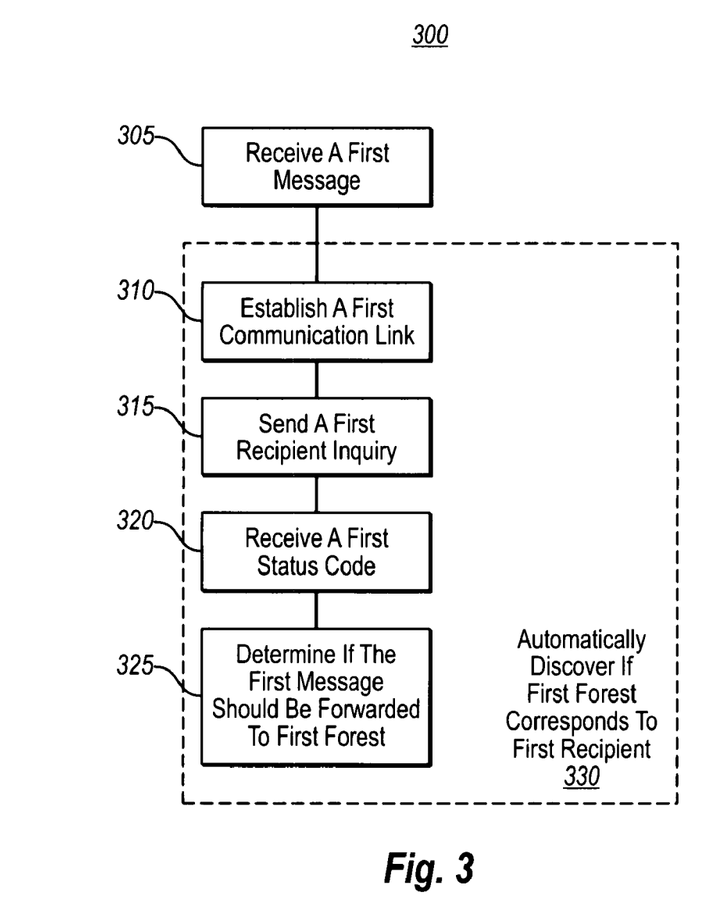
FIG. 3 illustrates a flow chart of a method of distributing messages within a network by automatically identifying what forest corresponds to a particular recipient in accordance with exemplary embodiments of the present invention.

FIG. 3 illustrates an example flow chart for various exemplary embodiments of the present invention. The following description of FIG. 3 will occasionally refer to corresponding elements from FIG. 2. Although reference may be made to a specific element from FIG. 2, such elements are used for illustrative purposes only and it is not meant to limit or otherwise narrow the scope of the present invention unless otherwise explicitly claimed.

FIG. 3 illustrates an example flow chart of a method 300 of distributing messages within a network by automatically identifying what forest corresponds to a particular recipient. Method 300 includes an act of receiving 305 a first message. For example, message server 215 that controls message delivery to a plurality of forests using a message protocol may receive a message 205. This first message received 205 includes a first destination address that does not uniquely identify a particular forest from among the plurality of forests. For example, the first destination address may be an ambiguous domain name. Further, the message protocol may be Simple Message Transfer Protocol (SMTP).

Method 300 further includes a step for automatically discovering 330 if the first forest corresponds to a first recipient. For example, message server 215 may utilize querying features of the message protocol (e.g., SMTP) along with the first destination address for automatically discovering if first forest 225 corresponds to the first recipient. Step 330 includes an act of establishing 310 a first communication link. For example, message server 215 may establish a first communication link between the first forest 225 and itself. Step 330 also includes an act of sending 315 a first recipient inquiry. For example, message server 215 may send recipient inquiry 220 to first forest 225 over the established communication link. Step 330 further includes an act of receiving 320 a first status code. For example, upon receiving the recipient inquiry 220 first forest 225 may generate a status code 230 which is then received by message server 215. Based upon the first status code, step 330 also includes an act of determining 325 if the first message should be forwarded to the first forest. For example, message server 215 can evaluate status code 230 for determining whether or not message 205 should be forwarded to first forest 225.

If the first forest 225 corresponds to the first recipient associated with the first destination address within message 205, information 260 may be stored in store 245 identifying the first forest 225 as corresponding to the first recipient. When subsequent messages are received that include destination addresses identifying the first recipient, e.g., user name, stored information 260 may be accessed for querying first forest 225 to determine whether or not first forest 225 corresponds to the first recipient before querying other forests, e.g., second forest 250. These subsequent messages received may or may not include a destination address identical to the first destination address of message 205. All that is needed if for the destination address to be able to uniquely identify the recipient, e.g., by user name.

Message server 215 may also automatically discover if a second forest corresponds to the first recipient by utilizing the querying features of the message protocol. Other exemplary embodiments provide that if second forest 250 is also discovered to correspond to the first recipient that information 260 may be stored along with the first information 260 for identifying the second forest as corresponding to the first recipient. In such instance, the information 260 that identifies the first and second forests as corresponding to the first recipient may be forwarded to system administrator 210 to determine whether the first message should be sent to the first or second forests. Other embodiments provide for sending the message to both the first and second forests.

Still other embodiments provide for querying each of the plurality forests, e.g., 225, 250, 255, using the message protocol to determine what forest correspond to the first recipient. In addition, the first message 205 may include multiple destination addresses that do not uniquely identify a particular forest from among the plurality of forest. In such instance, the plurality of forests are queried using the message protocol for determining what forests correspond to recipients associated with the multiple destination addresses.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 4:
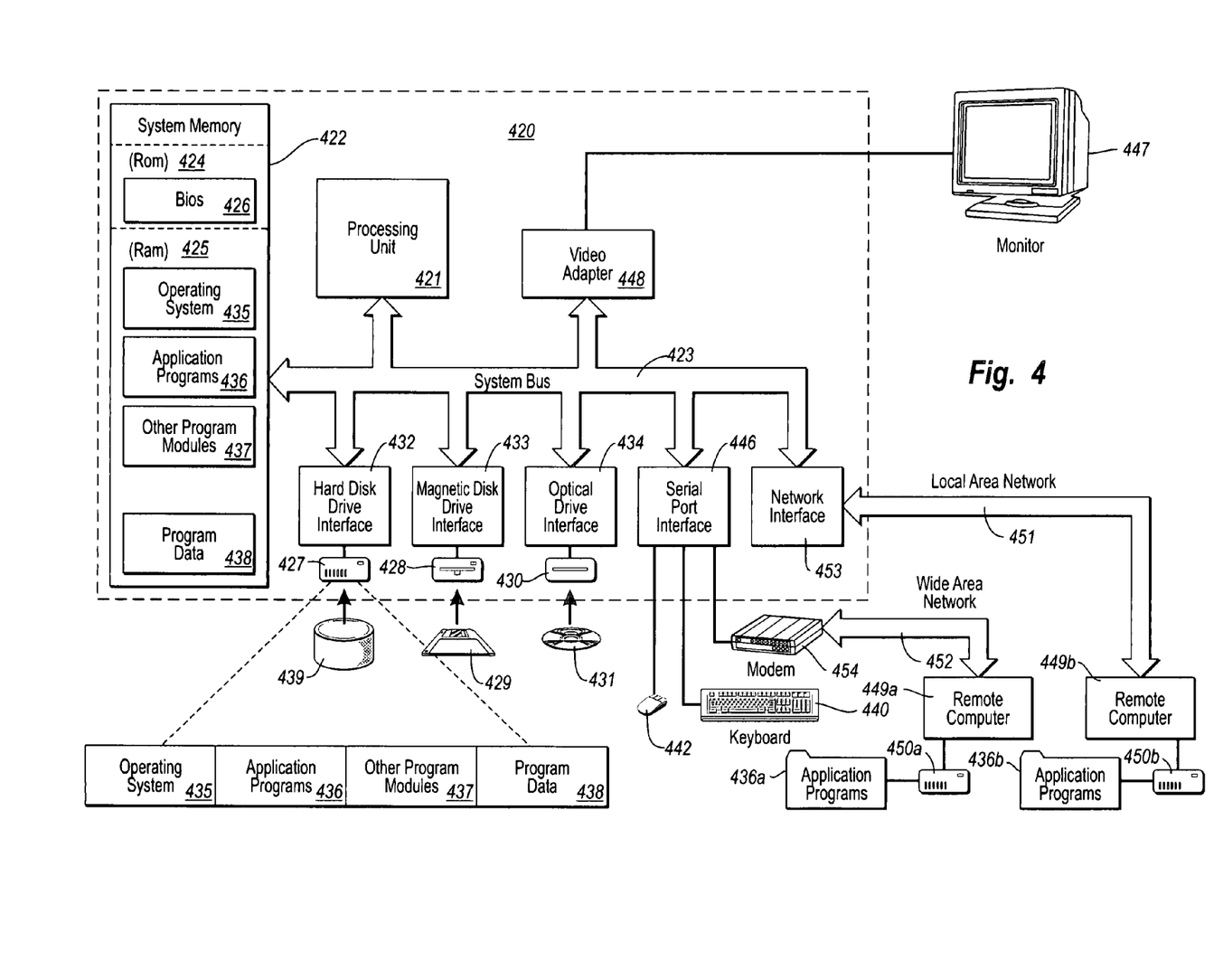
FIG. 4 illustrates an example system that provides a suitable operating environment for the present invention.

FIG. 4 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by and remote processing devices that are linked (either by hardwired links, wireless links, or by a combination of hardwired or wireless links) through a communications network. In a distributed computing environment, program modules may be located in both and remote memory storage devices.

With reference to FIG. 4, an exemplary system for implementing the invention includes a general purpose computing device in the form of a conventional computer 420, including a processing unit 421, a system memory 422, and a system bus 423 that couples various system components including the system memory 422 to the processing unit 421. The system bus 423 may be any of several types of bus structures including a memory bus or memory controller, a peripheral bus, and a bus using any of a variety of bus architectures. The system memory includes read only memory (ROM) 424 and random access memory (RAM) 425. A basic input/output system (BIOS) 426, containing the basic routines that help transfer information between elements within the computer 420, such as during start-up, may be stored in ROM 424.

The computer 420 may also include a magnetic hard disk drive 427 for reading from and writing to a magnetic hard disk 439, a magnetic disk drive 428 for reading from or writing to a removable magnetic disk 429, and an optical disk drive 430 for reading from or writing to removable optical disk 431 such as a CD-ROM or other optical media. The magnetic hard disk drive 427, magnetic disk drive 428, and optical disk drive 430 are connected to the system bus 423 by a hard disk drive interface 432, a magnetic disk drive-interface 433, and an optical drive interface 434, respectively. The drives and their associated computer-readable media provide nonvolatile storage of computer-executable instructions, data structures, program modules and other data for the computer 420. Although the exemplary environment described herein employs a magnetic hard disk 439, a removable magnetic disk 429 and a removable optical disk 431, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 439, magnetic disk 429, optical disk 431, ROM 424 or RAM 425, including an operating system 435, one or more application programs 436, other program modules 437, and program data 438. A user may enter commands and information into the computer 420 through keyboard 440, pointing device 442, or other input devices (not shown), such as a microphone, joy stick, game pad, satellite dish, scanner, or the like. These and other input devices are often connected to the processing unit 421 through a serial port interface 446 coupled to system bus 423. Alternatively, the input devices may be connected by other interfaces, such as a parallel port, a game port or a universal serial bus (USB). A monitor 447 or another display device is also connected to system bus 423 via an interface, such as video adapter 448. In addition to the monitor, personal computers typically include other peripheral output devices (not shown), such as speakers and printers.

The computer 420 may operate in a networked environment using logical connections to one or more remote computers, such as remote computers 449a and 449b. Remote computers 449a and 449b may each be another personal computer, a server, a router, a network PC, a peer device or other common network node, and typically include many or all of the elements described above relative to the computer 420, although only memory storage devices 450a and 450b and their associated application programs 436a and 436b have been illustrated in FIG. 4. The logical connections depicted in FIG. 4 include a area network (LAN) 451 and a wide area network (WAN) 452 that are presented here by way of example and not limitation. Such networking environments are commonplace in office-wide or enterprise-wide computer networks, intranets and the Internet.

When used in a LAN networking environment, the computer 420 is connected to the network 451 through a network interface or adapter 453. When used in a WAN networking environment, the computer 420 may include a modem 454, a wireless link, or other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing communications over wide area network 452 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a messaging server configured to deliver messages to message inboxes, the messaging server including a processor and system memory, the messaging server in a messaging system network that includes a plurality of forests corresponding to a plurality of domains, wherein each forest stores a plurality of message inboxes for a corresponding plurality of e-mail message recipients, and wherein no unified directory maps a particular forest as a forest that stores a particular message inbox corresponding to where a particular recipient receives e-mail messages, the messaging server configured to receive e-mail messages addressed within the plurality of domains and to deliver the received e-mail messages to particular forests that store particular message inboxes corresponding to the e-mail messages, a computer implemented method of delivering an e-mail message to a forest that stores a particular message inbox corresponding to where a particular recipient receives e-mail messages, the computer implemented method comprising acts of:

receiving an e-mail message, the e-mail message addressed to the particular recipient at a destination address, the destination address comprising a user name portion and a domain name portion, wherein the destination address is ambiguous such that at least the domain name portion identifies the messaging server, but does not uniquely identify any particular domain corresponding to a particular forest from among the plurality of forests that stores the particular message inbox corresponding to where the particular recipient receives e-mail messages;

sending a recipient inquiry using an e-mail message protocol to a first forest from among the plurality of forests, the first forest storing a subset of the plurality of message inboxes for a corresponding subset of the plurality of message recipients, the recipient inquiry sending at least the user name portion of the destination address and inquiring whether or not the first forest is a forest that stores the particular a candidate message inbox corresponding to where the particular recipient having the user name receives e-mail messages;

receiving a status code from the first forest using the e-mail message protocol, the status code indicating whether or not the first forest is a forest that stores the particular candidate message inbox corresponding to where the particular recipient receives e-mail messages; and based upon the status code, determining if the e-mail message should be forwarded to the first forest using the e-mail message protocol for subsequent delivery to the particular candidate message inbox corresponding to where the particular recipient receives e-mail messages, or if further recipient inquiries should be sent using the e-mail messaging protocol to other forests from among the plurality of forests, the other forests storing other different subsets of the plurality of message inboxes for corresponding other subsets of the plurality of message recipients, the further recipient inquiries inquiring whether or not the other forests are forests that store the particular other candidate message boxes corresponding to where the particular recipient receives e-mail messages;

wherein based on the status code it is determined that the e-mail message should be forwarded to the first forest is a forest that stores the particular for delivery to the candidate message inbox which corresponds to where the particular recipient receives messages, the method further comprising an act of: storing information identifying the first forest as a forest that stores the particular message inbox corresponding to where the particular recipient receives e-mail messages;

further comprising acts of sending a second further recipient inquiry using the e-mail messaging protocol to a second forest from among the plurality of forests, the second forest storing a second subset of the plurality of message inboxes for corresponding second subsets of the plurality of message recipients, the second further recipient inquiry sending at least the user name portion of the destination address and inquiring whether or not the second forest is also a forest that stores an other particular a second candidate message inbox corresponding to where the particular recipient having the user name receives e-mail messages;

receiving an additional status code from the second forest using the e-mail message protocol that indicates whether or not the second forest is a forest that stores the other particular second candidate message inbox corresponding to where the particular recipient receives e-mail messages; and based on upon the additional status code, determining if the message should be forwarded to the second forest for subsequent delivery to the other particular second candidate message inbox corresponding to where the specified recipient receives e-mail messages;

wherein based on the additional status code it is determined that the e-mail message should also be forwarded to the second forest for delivery to the second candidate message inbox corresponding to where the particular recipient also receives e-mail messages, the method further comprising an act of: storing additional information identifying the second forest as a forest that also stores the particular message inbox corresponding to where the particular recipient receives e-mail messages.

2. The method of claim 1, further comprising acts of:

sending the e-mail message to the first forest using the e-mail message protocol for delivery to the particular message inbox corresponding to where the particular recipient receives e-mail messages;

receiving an other e-mail message, the other e-mail message addressed to the particular recipient at an other destination address, wherein at least a portion of the other destination address identifies the particular recipient;

accessing the stored information for identifying the first forest as a forest that stores the particular message inbox corresponding to where the particular recipient receives e-mail messages;

prior to sending recipient inquiries to other forests from among the plurality of forests, sending another recipient inquiry using the e-mail message protocol to the first forest to determine if the first forest is still a forest that stores the particular message inbox corresponding to where the particular recipient receives e-mail messages;

receiving a further status code using the e-mail message protocol that indicates whether or not the first forest is still a forest that stores the particular message inbox corresponding to where the particular recipient receives e-mail messages; and based upon the further status code, determining if the other message should be forwarded to the first forest using the e-mail message protocol for subsequent delivery to the particular message inbox corresponding to where the particular recipient receives e-mail messages.

3. The method of claim 2, wherein the other destination address is identical to the destination address.

4. The method of claim 1, further comprising an act of: forwarding the information and the additional information to a system administrator to determine whether the message.

5. The method of claim 1, further comprising an act of: sending the message to both the first and second forests.

6. The method of claim 1, wherein based on the status code it is determined that the first forest is not a forest that stores the particular message inbox corresponding to where the particular recipient receives messages, the method further comprising acts of:

sending a further recipient inquiry using the e-mail messaging protocol to a second forest from among the plurality of forests, the second forest storing a second subset of the plurality of message inboxes for a corresponding subset of the plurality of message recipients, the further recipient inquiry sending at least the user name portion of the destination address and inquiring whether or not the second forest is a forest that stores a second candidate message inbox corresponding to where the particular recipient having the user name receives e-mail messages;

receiving a further status code using the e-mail message protocol that indicates whether or not the second forest is a forest that stores the second candidate message inbox corresponding to where the particular recipient receives e-mail messages; and based on upon the further status code, determining if the e-mail message should be forwarded to the second forest for subsequent delivery to the second candidate message inbox corresponding to where the particular recipient receives e-mail messages.

7. The method of claim 1, wherein the e-mail message protocol is simple message transfer protocol.

8. The method of claim 1, wherein the e-mail message includes an additional destination address addressed to an additional particular recipient, the additional destination address comprising a user name portion and a domain name portion, wherein the additional destination address is also ambiguous such that at least the domain name portion identifies the messaging server, but does not uniquely identify any particular domain corresponding to a particular forest from among the plurality of forests that stores the particular message inbox corresponding to where the additional particular recipient receives e-mail messages, the method further comprising acts of:

sending an additional recipient inquiry to the first forest, the additional recipient inquiry sending at least the user name portion of the additional destination address and inquiring whether or not the first forest is a forest that stores an additional candidate message inbox corresponding to where the additional particular recipient having the user name of the additional destination address receives e-mail messages;

receiving an additional status code that indicates whether or not the first forest is a forest that stores the additional candidate message inbox corresponding to where the additional particular recipient receives e-mail messages; and based upon the additional status code, determining if the e-mail message should be forwarded to the first forest for subsequent delivery to the additional candidate message inbox corresponding to where the additional particular recipient receives e-mail messages.

9. The method of claim 1, wherein based upon the status code, determining if the e-mail message should be forwarded to the next forest using the e-mail message protocol for subsequent delivery to the candidate message inbox corresponding to where the particular recipient receives e-mail messages comprises discovering that a message recipient receives messages at a first forest from among the plurality of forests.

10. The system of claim 9, wherein when subsequent messages are received that include destination addresses identifying the message recipient, the message server module is further configured to:

access stored information for querying the first forest to determine whether or not the message recipient still receives e-mail messages at the first forest.

11. The system of claim 10 wherein at least one of the subsequent messages received includes a destination address identical to the first destination address.

12. The system of claim 9, wherein the message server module is further configured to:

automatically discover if a second forest corresponds to the message recipient by utilizing the query features of the e-mail message protocol.

13. The system of claim 12, wherein the second forest is also discovered to correspond to the message recipient, and wherein information is stored identifying the second forest as storing another candidate message inbox corresponding to where the first recipient receives messages.

14. The system of claim 13, wherein the module in the message server is configured to forward information that identifies the first and second forests as corresponding to the message recipient to a system administrator to determine whether the first message should be sent to the first or second forest.

15. The system of claim 13, wherein the message is sent to both the first and second forests.

16. A computer program product for use at a messaging server in a messaging system network, the messaging system network including a plurality of forests corresponding to a plurality of domains, wherein each forest stores a plurality of message inboxes for a corresponding plurality of e-mail message recipients, and wherein no unified directory maps a particular forest as a forest that stores a particular message inbox corresponding to where a particular recipient receives e-mail messages, the messaging server configured to receive e-mail messages addressed within the plurality of domains and to deliver the received e-mail messages to particular forests that store particular message inboxes corresponding to the e-mail messages, the computer program product for implementing a method of delivering an e-mail message to a forest that stores a particular message inbox corresponding to where a particular recipient receives e-mail messages, the computer program product comprising one or more computer storage media having stored thereon computer executable instructions that, when executed by a processor, cause the messaging server to perform the method, including the following:

receiving an e-mail message, the e-mail message addressed to the particular recipient at a destination address, the destination address comprising a user name portion and a domain name portion, wherein the destination address is ambiguous such that at least the domain name portion identifies the messaging server, but does not uniquely identify any particular domain corresponding to a particular forest from among the plurality of forests that stores the particular message inbox corresponding to where the particular recipient receives e-mail messages;

sending a recipient inquiry using an e-mail message protocol to a first forest from among the plurality of forests, the first forest storing a subset of the plurality of message inboxes for a corresponding subset of the plurality of message recipients, the recipient inquiry sending at least the user name portion of the destination address and inquiring whether or not the first forest is a forest that stores the particular a candidate message inbox corresponding to where the particular recipient having the user name receives e-mail messages;

receiving a status code from the first forest using the e-mail message protocol, the status code indicating whether or not the first forest is a forest that stores the particular candidate message inbox corresponding to where the particular recipient receives e-mail messages; and based upon the status code, determining if the e-mail message should be forwarded to the first forest using the e-mail message protocol for subsequent delivery to the particular candidate message inbox corresponding to where the particular recipient receives e-mail messages, or if further recipient inquiries should be sent using the e-mail messaging protocol to other forests from among the plurality of forests, the other forests storing other different subsets of the plurality of message inboxes for corresponding other subsets of the plurality of message recipients, the further recipient inquiries inquiring whether or not the other forests are forests that store the particular other candidate message boxes corresponding to where the particular recipient receives e-mail messages;

wherein based on the status code it is determined that the e-mail message should be forwarded to the first forest for delivery to the candidate message inbox which corresponds to where the particular recipient receives e-mail messages, further comprising an act of: storing information identifying the first forest as a forest that stores the particular message inbox corresponding to where the particular recipient receives e-mail messages;

further comprising acts of sending a second further recipient inquiry using the e-mail messaging protocol to a second forest from among the plurality of forests, the second forest storing a second subset of the plurality of message inboxes for corresponding second subsets of the plurality of message recipients, the second further recipient inquiry sending at least the user name portion of the destination address and inquiring whether or not the second forest is also a forest that stores an other particular a second candidate message inbox corresponding to where the particular recipient having the user name receives e-mail messages;

receiving an additional status code from the second forest using the e-mail message protocol that indicates whether or not the second forest is a forest that stores the other particular second candidate message inbox corresponding to where the particular recipient receives e-mail messages; and based on upon the additional status code, determining if the message should be forwarded to the second forest for subsequent delivery to the other particular second candidate message inbox corresponding to where the specified recipient receives e-mail messages;

wherein based on the additional status code it is determined that the e-mail message should also be forwarded to the second forest for delivery to the second candidate message inbox corresponding to where the particular recipient also receives e-mail messages, the method further comprising an act of: storing additional information identifying the second forest as a forest that also stores the particular message inbox corresponding to where the particular recipient receives e-mail messages.

17. The computer program product of claim 16, further including computer executable instructions that, when executed, cause the server to send the e-mail message to the first forest using the e-mail message protocol for delivery to the particular message inbox corresponding to where the particular recipient receives e-mail messages;

receive an other e-mail message, the other e-mail message addressed to the particular recipient at an other destination address, wherein at least a portion of the other destination address identifies the particular recipient;

access the stored information for identifying the first forest as a forest that stores the particular message inbox corresponding to where the particular recipient receives e-mail messages;

prior to sending recipient inquiries to other forests from among the plurality of forests, send another recipient inquiry using the e-mail message protocol to the first forest to determine if the first forest is still a forest that stores the particular message inbox corresponding to where the particular recipient receives e-mail messages;

receive a further status code using the e-mail message protocol that indicates whether or not the first forest is still a forest that stores the particular message inbox corresponding to where the particular recipient receives e-mail messages; and based upon the further status code, determine if the other message should be forwarded to the first forest using the e-mail message protocol for subsequent delivery to the particular message inbox corresponding to where the particular recipient receives e-mail messages.

18. The computer program product of claim 17, wherein the other destination address is identical to the destination address.

19. The computer program product of claim 16, further including computer executable instructions that, when executed, cause the server to: forward the information and the additional information to a system administrator to determine whether the message should be sent to the first or second forest.

20. The computer program product of claim 16, further including computer executable instructions that, when executed, cause the server to: send the message to both the first and second forests.

21. The computer program product of claim 16, wherein based on the status code it is determined that the first forest is not a forest that stores the particular message inbox corresponding to where the particular recipient receives messages, the computer program product further including computer executable instructions that, when executed, cause the server to:

send a further recipient inquiry using the e-mail messaging protocol to a second forest among the plurality of forests, the second forest storing a second subset of the plurality of message inboxes for a corresponding subset of the plurality of message recipients, the further recipient inquiry sending at least the user name portion of the destination address and inquiring whether or not the second forest is a forest that stores a second candidate message inbox corresponding to where the particular recipient having the user name receives e-mail messages;

receive a further status code using the e-mail messaging protocol that indicates whether or not the second forest is a forest that stores the second candidate message inbox corresponding to where the particular recipient receives e-mail messages; and based on upon the further status code, determine if the e-mail message should be forwarded to the second forest for subsequent delivery to the second candidate message inbox corresponding to where the particular recipient receives e-mail messages.

22. The computer program product of claim 16, wherein the e-mail message protocol is simple message transfer protocol.

23. The computer program product of claim 16, wherein the e-mail message includes an additional destination address addressed to an additional particular recipient, the additional destination address comprising a user name portion and a domain name portion, wherein the additional destination address is also ambiguous such that at least the domain name portion identifies the messaging server, but does not uniquely identify any particular domain corresponding to a particular forest from among the plurality of forests that stores the particular message inbox corresponding to where the additional particular recipient receives e-mail messages, the computer program product further including computer executable instructions that, when executed, cause the server to:

send an additional recipient inquiry to the first forest, the additional recipient inquiry sending at least the user name portion of the additional destination address inquiring whether or not the first forest is a forest that stores an additional candidate message inbox corresponding to where the additional particular recipient having the user name of the additional destination address receives e-mail messages;

receive an additional status code that indicates whether or not the first forest is a forest that stores the additional candidate message inbox corresponding to where the additional recipient receives e-mail messages; and based upon the additional status code, determining if the e-mail message should be forwarded to the first forest for subsequent delivery to the additional candidate message inbox corresponding to where the additional particular recipient receives e-mail messages.

24. A network messaging system, the network messaging system comprising:

a message server; and a plurality of forests corresponding to a plurality of domains, wherein each forest stores a plurality of message inboxes for a corresponding plurality of message recipients;

wherein the message server comprises:

one or more processors;

system memory; and one or more computer storage media having stored thereon a module for controlling the distribution, the module configured to:

receive an e-mail message, the e-mail message addressed to the particular recipient at a destination address, the destination address comprising a user name portion and a domain name portion, wherein the destination address is ambiguous such that at least the domain name portion identifies the messaging server, but does not uniquely identify any particular domain corresponding to a particular forest from among the plurality of forests that stores the particular message inbox corresponding to where the particular recipient receives e-mail messages;

for one or more forests in the plurality of forests and until a forest where the particular recipient receives messages is identified:

sending a recipient inquiry using an e-mail message protocol to a next forest from among the plurality of forests, the next forest storing a subset of the plurality of message inboxes for a corresponding subset of the plurality of message recipients, the recipient inquiry including the destination address, the recipient inquiry sending at least the user name portion of the destination address and inquiring whether or not, based on the destination address, the next forest is a forest that stores a candidate message inbox corresponding to where the particular recipient having the user name receives e-mail messages;

receiving a status code from the next forest using the e-mail message protocol, the status code indicating whether or not the next forest is a forest that stores the particular candidate message inbox corresponding to where the specified recipient receives e-mail messages; and based upon the status code, determining if the e-mail message should be forwarded to the next forest using the e-mail message protocol for subsequent delivery to the particular candidate message inbox corresponding to where the particular recipient receives messages; and wherein each forest in the plurality of forests includes at least one computer system, the at least one computer system comprising:

one or more processors;

system memory; and one or more computer storage media having stored thereon a module for determining if a destination address corresponds to a recipient within its domain, the module configured to:

receive a recipient inquiry using the e-mail message protocol from the messaging server, the recipient inquiry including at least the user name portion of the destination address;

determine whether or not the forest is configured to receive store messages directed to the destination address user name in a corresponding message inbox;

based on the determination, generate a status code indicative of whether or not the forest is configured to receive messages directed to the destination address user name; and send the status code to the message server;

wherein based on the status code it is determined that the e-mail message should be forwarded to the first forest for delivery to the candidate message inbox which corresponds to where the particular recipient receives messages, further comprising an act of: storing information identifying the first forest as a forest that stores the particular message inbox corresponding to where the particular recipient receives e-mail messages;

further comprising acts of sending a second further recipient inquiry using the e-mail messaging protocol to a second forest from among the plurality of forests, the second forest storing a second subset of the plurality of message inboxes for corresponding second subsets of the plurality of message recipients, the second further recipient inquiry sending at least the user name portion of the destination address and inquiring whether or not the second forest is also a forest that stores an other particular a second candidate message inbox corresponding to where the particular recipient having the user name receives e-mail messages;

receiving an additional status code from the second forest using the e-mail message protocol that indicates whether or not the second forest is a forest that stores the other particular second candidate message inbox corresponding to where the particular recipient receives e-mail messages; and based on upon the additional status code, determining if the message should be forwarded to the second forest for subsequent delivery to the other particular second candidate message inbox corresponding to where the specified recipient receives e-mail messages;

wherein based on the additional status code it is determined that the e-mail message should also be forwarded to the second forest for delivery to the second candidate message inbox corresponding to where the particular recipient also receives e-mail messages, the method further comprising an act of: storing additional information identifying the second forest as a forest that also stores the particular message inbox corresponding to where the particular recipient receives e-mail messages.

25. The method of claim 1, wherein the domain name portion of the destination address comprises at least a first domain name corresponding to the first forest, and a second domain name corresponding to an other forest.

26. The computer program product of claim 16, wherein the domain name portion of the destination address comprises at least a first domain name corresponding to the first forest, and a second domain name corresponding to an other forest.

* * * * *